US012619745B2

(12) United States Patent (10) Patent No.: US 12,619,745 B2
Na et al. (45) Date of Patent: May 5, 2026

(54) HOMOMORPHIC OPERATION SYSTEM AND OPERATING METHOD THEREOF

(71) Applicant: SAMSUNG ELECTRONICS CO., LTD., Suwon-si (KR)

(72) Inventors: Hanbyeul Na, Suwon-si (KR); Sangpyo Kim, Seoul (KR); Jongmin Kim, Seoul (KR); Jung Ho Ahn, Seoul (KR); Dong-Min Shin, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 161 days.

(21) Appl. No.: 18/396,342

(22) Filed: Dec. 26, 2023

(65) Prior Publication Data

US 2024/0362343 A1 Oct. 31, 2024

(30) Foreign Application Priority Data

Apr. 27, 2023 (KR) ........................ 10-2023-0055429
Jun. 22, 2023 (KR) ........................ 10-2023-0080427

(51) Int. Cl.
*G06F 21/60* (2013.01)
*G06F 5/06* (2006.01)
(Continued)

(52) U.S. Cl.
CPC .............. *G06F 21/602* (2013.01); *G06F 5/06* (2013.01); *G06F 7/523* (2013.01); *G06F 21/78* (2013.01)

(58) Field of Classification Search
CPC .......... G06F 21/602; G06F 5/06; G06F 7/523; G06F 21/78
See application file for complete search history.

(56) References Cited

U.S. PATENT DOCUMENTS 7,343,389 B2 3/2008 Macy et al.
9,996,499 B2 6/2018 Suvakovic et al.
(Continued)

FOREIGN PATENT DOCUMENTS

JP 2005043637 2/2005
KR 10-1753467 7/2017

OTHER PUBLICATIONS

Kim, et al., "ARK: Fully Homomorphic Encryption Accelerator with Runtime Data Generation and Inter-Operation Key Reuse", arXiv preprint arXiv:2205.00922v1 [cs.CR] May 2, 2022, pp. 1-14.
(Continued)

*Primary Examiner* — J. Brant Murphy
(74) *Attorney, Agent, or Firm* — MORGAN, LEWIS & BOCKIUS LLP

(57) ABSTRACT

A homomorphic operation system according to an embodiment includes a homomorphic encryption device configured to output a first ciphertext data generated based on a first base, a homomorphic encryption server including a storage device storing base conversion table configured to convert ciphertext data based on the first base into a second ciphertext data based on a second base and the first ciphertext data received from the homomorphic encryption device, and a homomorphic encryption operation device configured to perform a predetermined operation using the base conversion table on the first ciphertext data to convert the first ciphertext data into the second ciphertext data based on the second base.

20 Claims, 8 Drawing Sheets

(51) Int. Cl.

| | |
|---|---|
| *G06F 7/523* | (2006.01) |
| *G06F 21/78* | (2013.01) |

(56) References Cited

U.S. PATENT DOCUMENTS

| | | | | |
|---|---|---|---|---|
| 10,797,858 | B2 | 10/2020 | Suresh et al. | |
| 2003/0212727 | A1 | 11/2003 | Macy et al. | |
| 2006/0033608 | A1* | 2/2006 | Juels | G06K 19/07336 |
| | | | | 340/572.1 |
| 2007/0198901 | A1 | 8/2007 | Ramchandran et al. | |
| 2009/0319804 | A1 | 12/2009 | Qi et al. | |
| 2012/0079236 | A1 | 3/2012 | Suvakovic et al. | |
| 2015/0270957 | A1* | 9/2015 | Uzun | H04L 63/062 |
| | | | | 713/168 |
| 2019/0245679 | A1 | 8/2019 | Suresh et al. | |
| 2020/0313856 | A1* | 10/2020 | Basu | H04L 9/3073 |
| 2021/0377016 | A1* | 12/2021 | Perlman | H04L 9/0891 |
| 2022/0286282 | A1* | 9/2022 | Jeljeli | H04L 9/0894 |
| 2022/0329414 | A1* | 10/2022 | Gaddam | H04L 9/0861 |
| 2023/0081763 | A1 | 3/2023 | Boemer et al. | |
| 2024/0195618 | A1* | 6/2024 | Paul | H04L 9/14 |

OTHER PUBLICATIONS

Feldmann, et al., "F1: A Fast and Programmable Accelerator for Fully Homomorphic Encryption", in MICRO, 2021, https://doi.org/10.1145/3466752.3480070, pp. 238-252.

Kim, et al., "BTS: An Accelerator for Bootstrappable Fully Homomorphic Encryption", in ISCA, 2022, arXiv preprint arXiv:2112.15479v2 [cs.CR] Apr. 29, 2022, https://doi.org/10.1145/3470496.3527415, 15 pages.

Samardzic, et al., "CraterLake: A Hardware Accelerator for Efficient Unbounded Computation on Encrypted Data", in ISCA, 2022, https://doi.org/10.1145/3470496.3527393, pp. 173-187.

* cited by examiner

HOMOMORPHIC OPERATION SYSTEM AND OPERATING METHOD THEREOF

CROSS-REFERENCE TO RELATED APPLICATION

This application claims priority under 35 U.S.C. § 119 to and the benefit of Korean Patent Application No. 10-2023-0055429 filed in the Korean Intellectual Property Office on Apr. 27, 2023, and Korean Patent Application No. 10-2023-0080427 filed in the Korean Intellectual Property Office on Jun. 22, 2023, the entire contents of which are incorporated herein by reference.

BACKGROUND

(a) Field

The present disclosure relates to a homomorphic operation system and an operating method thereof.

(b) Description of the Related Art

Electronic and communication technologies, including various services for transmitting and receiving data between various devices have been developed. As an example, a cloud computing service in which users store their personal information in a server and use the stored information of the server is actively used. In such an environment, security technology to prevent data leakage is utilized.

Homomorphic encryption technology is an encryption technology that supports operations, such as the operation, search, and analysis of homomorphic encrypted ciphertext, and its importance has been further emphasized as leakage of personal information has become a problem in modern times. In general, if a homomorphic encryption method is used, even if an operation is performed on the ciphertext itself without decrypting the encrypted information, the same result as the encrypted value after the operation on the plaintext may be obtained. Accordingly, various operations can be performed without decrypting the ciphertext.

However, the size of the ciphertext encrypted according to the homomorphic encryption technology is tens of times larger than the size of the plaintext before encryption, and the computational complexity of the homomorphic operations supported by the homomorphic encryption technology is also very high. This results in an issue where the processing time is slower than the conventional plaintext operation method.

SUMMARY

The present disclosure attempts to provide a homomorphic encryption operation accelerator with a reduced homomorphic encryption operation time, and a method of operating the homomorphic encryption operation accelerator.

A homomorphic operation system according to an embodiment comprises a homomorphic encryption device configured to output a first ciphertext data generated based on a first base, and a homomorphic encryption server comprising a storage device storing a base conversion table for converting ciphertext data based on the first base into a ciphertext data based on a second base and the first ciphertext data received from the homomorphic encryption device, and a homomorphic encryption operation device configured to perform a predetermined operation using the base conversion table on the first ciphertext data to convert the first ciphertext data into a second ciphertext data based on the second base.

An operating method of a homomorphic operation system according to an embodiment includes receiving a first ciphertext data generated based on a first base, and performing a predetermined operation to convert the first ciphertext data into a second ciphertext data based on a second base, based on a base conversion table for converting ciphertext data based on the first base into ciphertext data based on the second base.

A homomorphic operation accelerator according to an embodiment comprises a first MAC unit comprising a plurality of first input buffers configured to receive and store a first coefficient in a plurality of coefficients from a storage device in which a first ciphertext data generated based on a first base and including a plurality of coefficients is stored, a first broadcasting buffer configured to store a first base conversion value among a base conversion table for converting data based on the first base into a second base, and a first multiplier connected to the plurality of first input buffers and the first broadcasting buffer configured to generate a first multiplication value by multiplying the first coefficient and the first base conversion value, and a modulo operation device coupled to the first MAC unit, wherein the modulo operation device is configured to perform a modulo operation on the multiplication value.

BRIEF DESCRIPTION OF THE DRAWINGS

FIG. 3 is a block diagram illustrating a homomorphic encryption operation device according to an embodiment.

FIG. 6 is a diagram illustrating an operation of a homomorphic operation accelerator according to an embodiment.

FIG. 9 is a diagram exemplarily illustrating an electronic device to which a storage device according to an embodiment is applied.

DETAILED DESCRIPTION OF THE EMBODIMENTS

Figure 1:
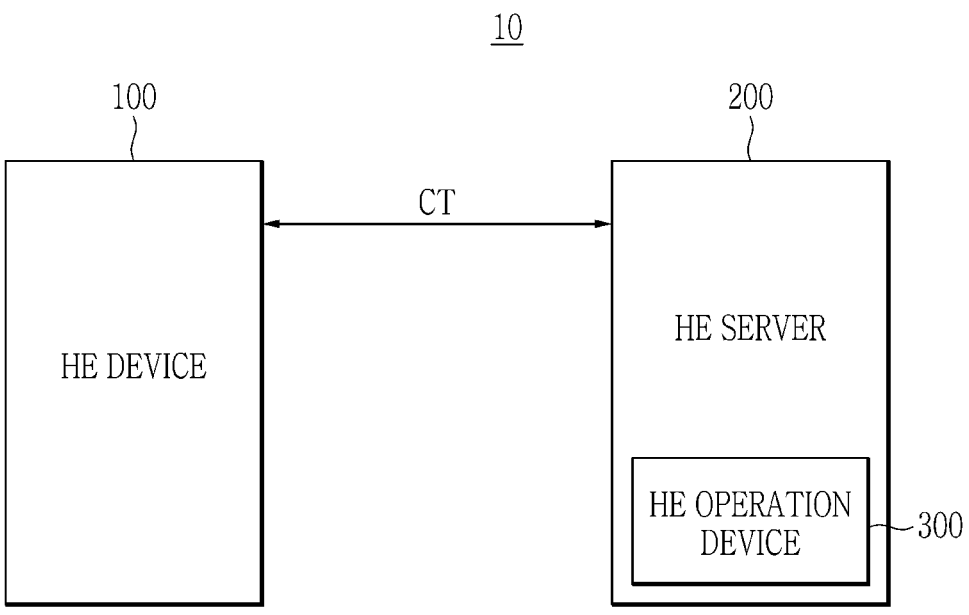
FIG. 1 is a diagram illustrating an operating system for homomorphic encryption according to an embodiment.

In the following detailed description, the present disclosure will be described with reference to the accompanying drawings, in which various embodiments of the present disclosure are shown. As those skilled in the art would realize, the described embodiments may be modified in various different ways without departing from the spirit or scope of the present disclosure.

The drawings and description are to be regarded as illustrative in nature and not restrictive. Like reference numerals designate like elements throughout the specification. In the flowchart described with reference to drawings in this description, the operation order may be changed, several operations may be merged, certain operations may be divided, and specific operations may not be performed.

In the description, expressions described in the singular in this specification may be interpreted as the singular or plural unless an explicit expression such as "one" or "single" is used. Although terms of "first," "second," and the like are used to explain various constituent elements, the constituent elements are not limited to such terms. These terms are only used to distinguish one constituent element from another constituent element.

FIG. 1 is a diagram illustrating an operating system for homomorphic encryption according to an embodiment.

Referring to FIG. 1, a homomorphic operation system 10 may include a homomorphic encryption (HE) server 200 and a homomorphic encryption (HE) device 100. In FIG. 1, the homomorphic operation system 10 is illustrated as including one homomorphic encryption device 100, but the present disclosure is not limited thereto, and the homomorphic operation system 10 may include a plurality of homomorphic encryption devices 100.

In various embodiments, the homomorphic encryption server 200 and the homomorphic encryption device 100 may communicate with each other via a network, where the network can provide a communication path. In an embodiment, the homomorphic encryption device 100 may transmit ciphertext data CT to the homomorphic encryption server 200 or may request the ciphertext data CT. The ciphertext data CT may be data encrypted by applying a homomorphic encryption technique to plaintext data. The ciphertext data CT is represented by a pair of polynomials $(a(X), b(X))$ on a polynomial ring $R_Q=Z_Q[X]/(X^N+1)$. A polynomial ring $R_Q$ means a set whose plaintext space is a real number among sets that are closed for addition and multiplication. $Z_Q$ is a coefficient, and N is a degree.

A polynomial $m(X)=\Sigma c_{N-1}X^{N-1}$ on a polynomial ring $R_Q$ is a polynomial in which the coefficient, $c_i$, of each term is an integer less than Q, and the highest order term is less than or equal to N−1 (N is a natural number). Here, Q may be a larger integer requiring a precision of several thousand bits or more.

When a coefficient is greater than Q through operation between different polynomials on a polynomial ring, $R_Q$, the size of the coefficient must be kept smaller than Q through a modulo operation with Q as a divisor. In this case, up to N/2 complex numbers may be packed into one ciphertext according to N, corresponding to the degree on the polynomial ring $R_Q$. Here, packing may encrypt a plurality of messages into one ciphertext. The precision of each complex number can be data of around tens of bits, and the size of data may be increased by several tens of times (i.e., orders of magnitude) by an encryption process.

In various embodiments, the homomorphic encryption server 200 and the homomorphic encryption device 100 may perform at least one of homomorphic encryption, homomorphic decryption, and/or homomorphic operations according to a homomorphic encryption technique. In the homomorphic encryption technology, first result data obtained based on plaintext data and second result data obtained based on the plaintext data may be substantially the same as each other. The first result data may be generated by performing a specific operation on the plaintext data and performing encryption on the same plaintext data on which the specific operation is performed. The second result data may be generated by performing the encryption on the plaintext data and performing the specific operation on the encrypted plaintext data.

Homomorphic encryption techniques may include partially homomorphic encryption (PHE), somewhat homomorphic encryption (SHE), and fully homomorphic encryption (FHE).

The partially homomorphic encryption may only allow one type of mathematical operation (e.g., multiplication) on a given data set. The somewhat homomorphic encryption may allow addition and multiplication a limited number of times on a given data set. The fully homomorphic encryption may allow various types of operations on a data set without limit.

The fully homomorphic encryption technology may include various encryption schemes, such as BGV (Brakerski, Gentry, and Vaikuntanathan), BFV (Brakerski, Fan, and Vercauteren), and CKKS (Cheon, Kim, Kim and Song). Fully homomorphic encryption technologies may generate ciphertext through the encryption operation process, which maps the message to pairs of n-order polynomials in the process of encrypting the message by the base problem, Ring-Learning with Error (R-LWE) definition, adds a noise value called an error polynomial, and includes the encryption key polynomial in the message polynomial.

Specifically, the homomorphic encryption technique may satisfy Equation 1 below.

$$OP(E(PD)) = E(OP(PD)) \qquad \text{[Equation 1]}$$

Here, PD is plaintext data, E(PD) is a function that performs the encryption on the plaintext data, and OP(PD) is a function that performs an operation on the plaintext data.

In various embodiments, the homomorphic encryption device 100 may be implemented to convert plaintext into ciphertext, or convert ciphertext into plaintext using a homomorphic encryption algorithm. In an embodiment, the homomorphic encryption device 100 may be a user device. For example, the user device may be various electronic devices, such as a storage device, a portable communication device (e.g., a smart phone), a computer device, a portable multimedia device, a portable medical device, a camera, a wearable device, or a home appliance. The electronic device may be applied to intelligent services, such as smart home, smart city, smart car, or health care based on wireless communication technology and Internet of Things (IoT) related technology.

In various embodiments, the homomorphic encryption server 200 may receive ciphertext data CT from the homomorphic encryption device 100. For example, the homomorphic encryption server 200 may provide a cloud service or an ultra-low latency service using distributed computing or mobile edge computing. As another example, the homomorphic encryption server 200 may be an intelligent server using machine learning and/or neural networks.

In various embodiments, the homomorphic encryption server 200 may include a homomorphic encryption operation device 300, where the homomorphic encryption operation device 300 may perform an operation on ciphertext data received from the homomorphic encryption device 100.

In various embodiments, the homomorphic encryption operation device 300 may be implemented to efficiently parallelize a numeric theoretic transform (NTT) operation and a base conversion (BaseConv) operation, which can occupy most of the time in the homomorphic encryption operation. The NTT operation may convert the data to simplify the complexity of polynomial multiplication of homomorphic ciphertexts. The BaseConv operation may convert a base set on the NTT domain to a base set on the residue number system (RNS). The homomorphic encryption operation device 300 may arrange operators in a chain to effectively reduce the total execution time of a homomorphic encryption operation, particularly the time involved in a matrix multiplication operation.

In an embodiment, the homomorphic encryption device 100 may generate ciphertext data by performing homomorphic encryption on plaintext data, and transmit the ciphertext data CT to the homomorphic encryption server 200. The ciphertext data CT may include homomorphic encryption information about a homomorphic encryption algorithm used to perform homomorphic encryption. For example, the homomorphic encryption information may include information about a base used for the encryption. The homomorphic encryption operation device 300 may receive and store the ciphertext data CT from the homomorphic encryption device 100 and may subsequently perform homomorphic operations on the ciphertext data CT, where the relationships between the elements in both sets are maintained. The homomorphic encryption operation device 300 may perform a predetermined homomorphic operation on the ciphertext data CT. When the homomorphic encryption operation device 300 receives a request to perform a specific homomorphic operation from the homomorphic encryption device 100, the homomorphic encryption operation device 300 may perform a corresponding specific homomorphic operation. When the homomorphic encryption server 200 receives a request for the ciphertext data CT on which the homomorphic operation is performed from the homomorphic encryption device 100, the homomorphic encryption server 200 may transmit the ciphertext data CT on which the homomorphic operation is performed to the homomorphic encryption device 100. The homomorphic encryption device 100 may perform a decryption on the transmitted ciphertext data CT to generate plaintext data.

In various embodiments, the ciphertext data CT may be generated by performing encryption by the homomorphic encryption device 100, where the homomorphic encryption algorithm used by the homomorphic encryption device 100 to perform encryption may be different according to a type of the homomorphic encryption device 100. When the homomorphic operation system 10 includes a plurality of homomorphic encryption devices 100, the homomorphic encryption server 200 may perform a homomorphic operation on a plurality of ciphertext data based on homomorphic encryption information corresponding to each of the plurality of ciphertext data.

Figure 2:
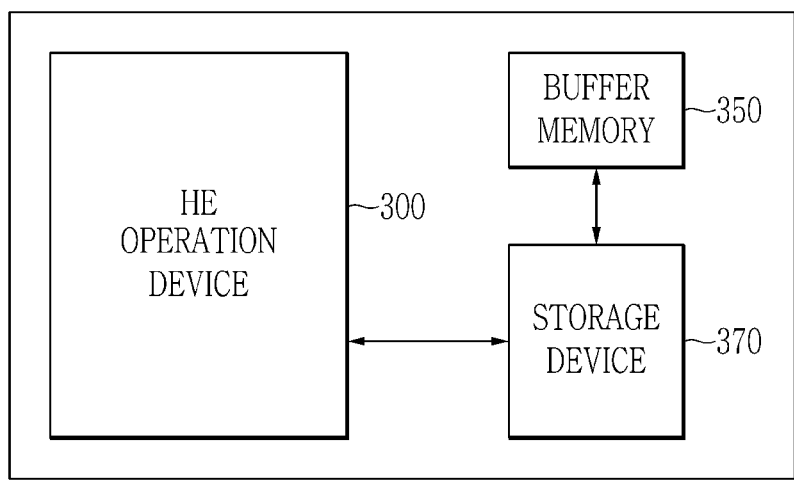
FIG. 2 is a block diagram illustrating a homomorphic encryption server according to an embodiment.

FIG. 2 is a block diagram illustrating a homomorphic encryption server according to an embodiment.

Referring to FIG. 2, the homomorphic encryption server 200 may include a homomorphic encryption (HE) operation device 300, a buffer memory 350, and a storage device 370.

In various embodiments, the homomorphic encryption operation device 300 may control configurations in the homomorphic encryption server 200.

In various embodiments, the storage device 370 may control the buffer memory 350 under the control of the homomorphic encryption operation device 300. In various embodiments, the storage device 370 may store a base conversion table utilized for base conversion, an equation coefficient matrix for ciphertext data transmitted from the homomorphic encryption device 100, and the like. The equation coefficient matrix may represent ciphertext data in an arbitrary base.

For example, $[a(x)]_C$, the representation of polynomial $$a(x) = \sum_{i=0}^{N-1} a_i x^i$$

as a base $C=\{q_0, q_1, \ldots, q_l\}$, may be represented by a l×N matrix M, whose component of $M_{j,k}$ row, k column is $[a_{0 \le k < N}]_{q_{0 \le j \le l}}$. The base conversion table may be a matrix that multiplies an equation coefficient matrix to transform an equation coefficient matrix having a first base into an equation coefficient matrix having a second base as a target base.

For example, a base conversion table T for converting an equation coefficient matrix M into a representation to the base $B=\{p_0, p_1, \ldots, p_k\}$ may have a component $[\hat{q}_j]_{p_j}$ of i row, j column. The base conversion table may be predetermined and set in advance.

In various embodiments, the storage device 370 may include a flash-based memory, such as a NAND flash memory. The flash memory may include a 2D NAND memory array or a 3D (or vertical) NAND (VNAND) memory array. In an embodiment, the memory device 100 may include a phase-change memory, resistive memory, magnetoresistive memory, ferroelectric memory, or polymer memory, for example.

In various embodiments, the buffer memory 350 may temporarily store instructions and data executed and processed by the homomorphic encryption operation device 300 or the storage device 370. The buffer memory 350 may temporarily store data also stored in the storage device 370 or desired to be stored in the storage device 370. In various embodiments, the buffer memory 350 may temporarily store ciphertext data transmitted from the homomorphic encryption device 100.

In various embodiments, the buffer memory 350 may be implemented by volatile memory, such as dynamic random access memory (DRAM) or static RAM (SRAM); however, the buffer memory 350 is not limited thereto, and the buffer memory 350 may be implemented as various types of non-volatile memory, such as magnetic RAM (MRAM), phase change RAM (PRAM), or resistive non-volatile memory such as resistive RAM (ReRAM), flash memory, nano floating gate memory (NFGM), polymer random access memory (PoRAM), or ferroelectric random access memory (FRAM), and the like.

In FIG. 2, the buffer memory 350 is shown as a separate configuration from the homomorphic encryption operation device 300 and the storage device 370, but the present disclosure is not limited thereto. The buffer memory 350 may be included in the homomorphic encryption operation device 300 or the storage device 370, and may be positioned outside the homomorphic encryption server 200.

In various embodiments, the homomorphic encryption operation device 300 may receive ciphertext data from the homomorphic encryption device 100 and perform a homomorphic operation on the received ciphertext data. The homomorphic encryption operation device 300 may transmit the result of the homomorphic operation to the homomorphic encryption device 100. Specifically, the homomorphic encryption operation device 300 may determine the base of the ciphertext data based on the homomorphic encryption information included with the ciphertext data received from the homomorphic encryption device 100. For example, the base of the ciphertext data may be the first base. Thereafter, the homomorphic encryption operation device 300 may read a base conversion table for converting the base of ciphertext data into data having a target base in the storage device 370, where for example, the target base may be the second base. The homomorphic encryption operation device 300 may convert ciphertext data based on the first base into target data based on the second base, based on the read base conversion table. For example, the homomorphic encryption operation device 300 may generate target data by multiplying ciphertext data by a base conversion table.

Specifically, the homomorphic encryption operation device 300 may use a Chinese remainder theorem (CRT) to reduce high computational complexity. CRT means that for any coprime integers $p_1$, $p_2$, $p_3$, . . . $p_k$, an integer Z that satisfies $Z<\Pi_{1\leq r\leq k} p_t$ is uniquely representable as the remainders of the integer Z divided by $p_1$, $p_2$, $p_3$, . . . $p_k$. In this case, the coprime integers $p_1$, $p_2$, $p_3$, . . . $p_k$ used are called the base.

Many homomorphic cryptosystems may use the CRT to reduce the computational complexity of the ciphertext, which requires big-integer computation.

The coefficients of the polynomial represented on the polynomial ring $R_Q$ by the CRT may be represented as $R_{q0}$, $R_{q1}$, . . . , $R_{qL}$, which are polynomials of the remainders divided through the bases belonging to $q_1$, $q_2$, $q_3$, . . . $q_i$. Representations in this remainder form are called residue number system (RNS) representations. Through this, an operation between polynomials on a polynomial ring, $R_Q$, is changed to an operation between polynomials on a polynomial, $R_{qi}$, having remainders as coefficients. In this case, the polynomial on each $R_{qi}$ phase is called a residual polynomial. The coefficients of these polynomials are numbers less than or equal to $q_i$. For example, $q_i$ may be set to a number of 64 bits or less that is friendly to a general computing platform. As a result, operation overhead from big-integers may be reduced. With CRT, an N-order polynomial on $Z_Q$ may be expressed as L N-order polynomials. L N-order polynomials may be represented as a l×N matrix, having coefficients of different degrees in the horizontal direction and remainders of dividing one coefficient by different degrees $q_i$ in the vertical direction. For operations between polynomials represented using different bases in homomorphic encryption operations, higher-order polynomials with $q_1$, $q_2$, $q_3$, . . . $q_i$ used as bases can be converted to $R_{p0}$, $R_{p1}$, . . . , $R_{pk}$ with $p_1$, $p_2$, $p_3$, . . . $p_k$ as the bases. The conversion to a new base may be performed by using a reverse process of CRT to restore the polynomial represented in $R_{q0}$, $R_{q1}$, . . . , $R_{qL}$, to a polynomial in $Z_Q$ and then obtaining the remainder in a new base. However, this conversion process may have high computational complexity.

Accordingly, the homomorphic encryption operation device 300 may use fast base conversion (FBC). FBC is a method of obtaining a remainder for a new base without going through a big integer for the base used in the CRT. FBC may be performed by multiplying a l×N matrix represented as existing bases by a k×L matrix including constants. Specifically, FBC may be performed through Equation 2.

$$Conv_{c\to B}([a(x)]_c) = \left(\left[\sum_{j=0}^{l-1}\left[[a(x)]_{q_j} * \hat{q_J}^{-1}\right]_{q_j} * [\hat{q_J}]_{pi}\right]_{0\leq i\leq k}\right) \quad \text{[Equation 2]}$$

First, $[a(x)]_C$, which is the representation of the polynomial $$a(x) = \sum_{i=0}^{N-1} a_i x^i$$

as a base C={$q_0$, $q_1$, . . . , $q_l$}, may be viewed as a l×N matrix, M, whose components $M_{j,k}$ of j row, k column are $[a_{0\leq k<N}]_{q_{0\leq j\leq l}}$. First, the homomorphic encryption operation device 300 may calculate a size-adjusted matrix M' through a modulo multiplication operation of elements $M_{j,k}$ and $\hat{q}_j^{-1}$. In this case, the M' is l×N. Thereafter, modulo multiplication and accumulation may be performed by performing the matrix multiplication T×M' on the matrix M' for a matrix whose component is $[\hat{q}_j]_{p_i}$ in i row, j column. Here, $\hat{q}_j=\Pi_{i\neq j}q_i$, $\forall q_i \in C$. The matrix T is called the base conversion table. Among modulo multiplication operation of elements $M_{j,k}$ and $\hat{q}_j^{-1}$ and matrix multiplication T×M', the step with the larger amount of computation is the second step of performing matrix multiplication, which accounts for about 96% of the total fast base conversion operations.

In various embodiments, in the matrix multiplication operation, operations on individual coefficients may be performed independently of each other. Accordingly, the homomorphic encryption operation device 300 may use a single instruction multiple data (SIMD) method that performs an operation by using data for different coefficients in parallel when performing FBC. SIMD is a parallel processing technique used when performing the same operation, regardless of the data being operated on, where SIMD may simultaneously perform operations on multiple data with a single instruction.

Figure 3:
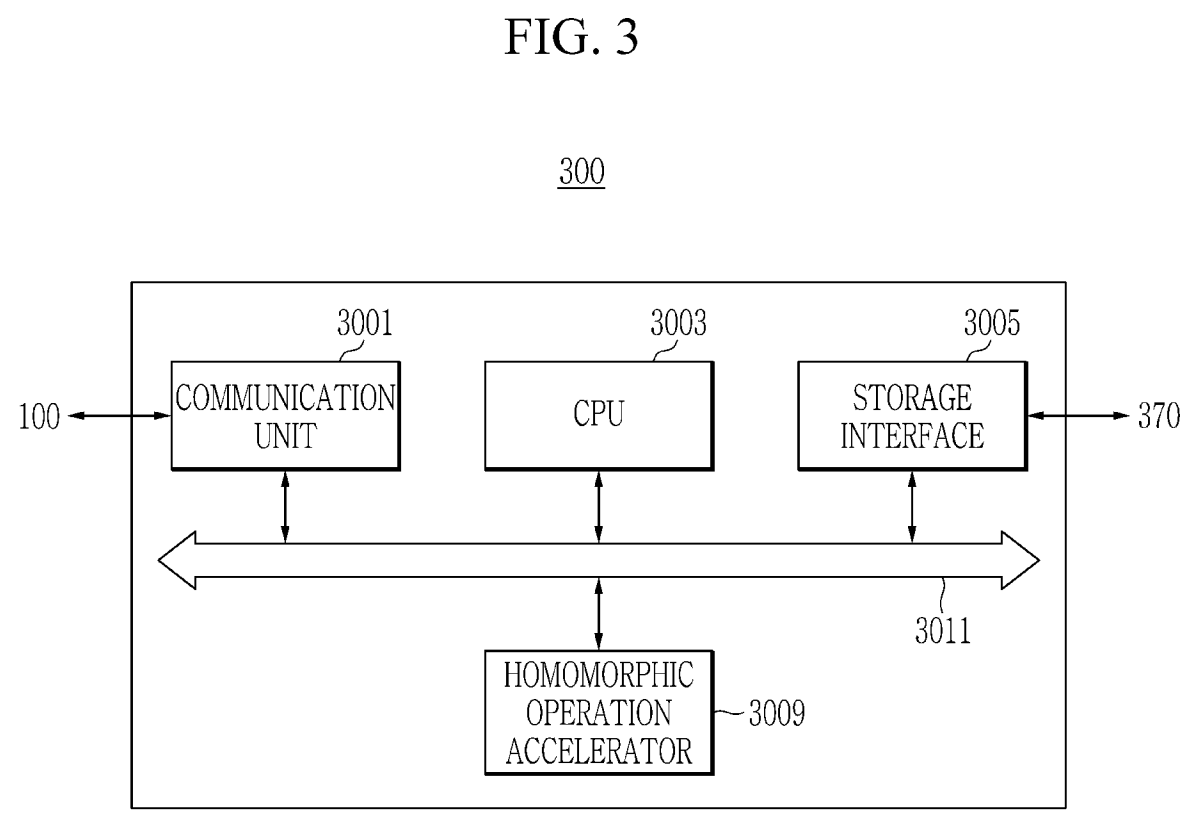

FIG. 3 is a block diagram illustrating a homomorphic encryption operation device according to an embodiment.

Referring to FIG. 3, the homomorphic encryption operation device 300 includes a communication unit 3001, a central processing unit (CPU) 3003, a storage interface 3005, a homomorphic operation accelerator 3009, and a main bus circuit 3011.

In various embodiments, the CPU 3003 may control the communication unit 3001, the storage interface 3005, the homomorphic operation accelerator 3009, and the main bus circuit 3011.

In various embodiments, the homomorphic encryption operation device 300 may communicate with the homomorphic encryption device 100 through the communication unit 3001. For example, the homomorphic encryption operation device 300 may transmit/receive ciphertext data from the homomorphic encryption device 100 through the communication unit 3001. The homomorphic encryption operation device 300 may receive a command or data to be programmed into the storage device 370 through the communication unit 3001. The homomorphic encryption operation device 300 may transmit a result of the homomorphic operation to the homomorphic encryption device 100 through the communication unit 3001.

In various embodiments, the homomorphic encryption operation device 300 may transmit data to the storage device 370 or receive data from the storage device 370 through the storage interface 3005. For example, the homomorphic encryption operation device 300 may transmit ciphertext data received through the communication unit 3001 to the storage device 370 through the storage interface 3005. The homomorphic encryption operation device 300 may receive data read from the storage device 370 through the storage interface 3005. The homomorphic encryption operation device 300 may transmit the result of the homomorphic operation to the storage device 370 through the storage interface 3005.

In various embodiments, the homomorphic operation accelerator 3009 may perform a homomorphic operation on ciphertext data. In one embodiment, homomorphic operation accelerator 3009 may include a plurality of modules for performing homomorphic operations.

The communication unit 3001, the storage interface 3005, the buffer memory 350, and the homomorphic operation accelerator 3009 may transmit or receive data through the main bus circuit 3011.

Figure 4:
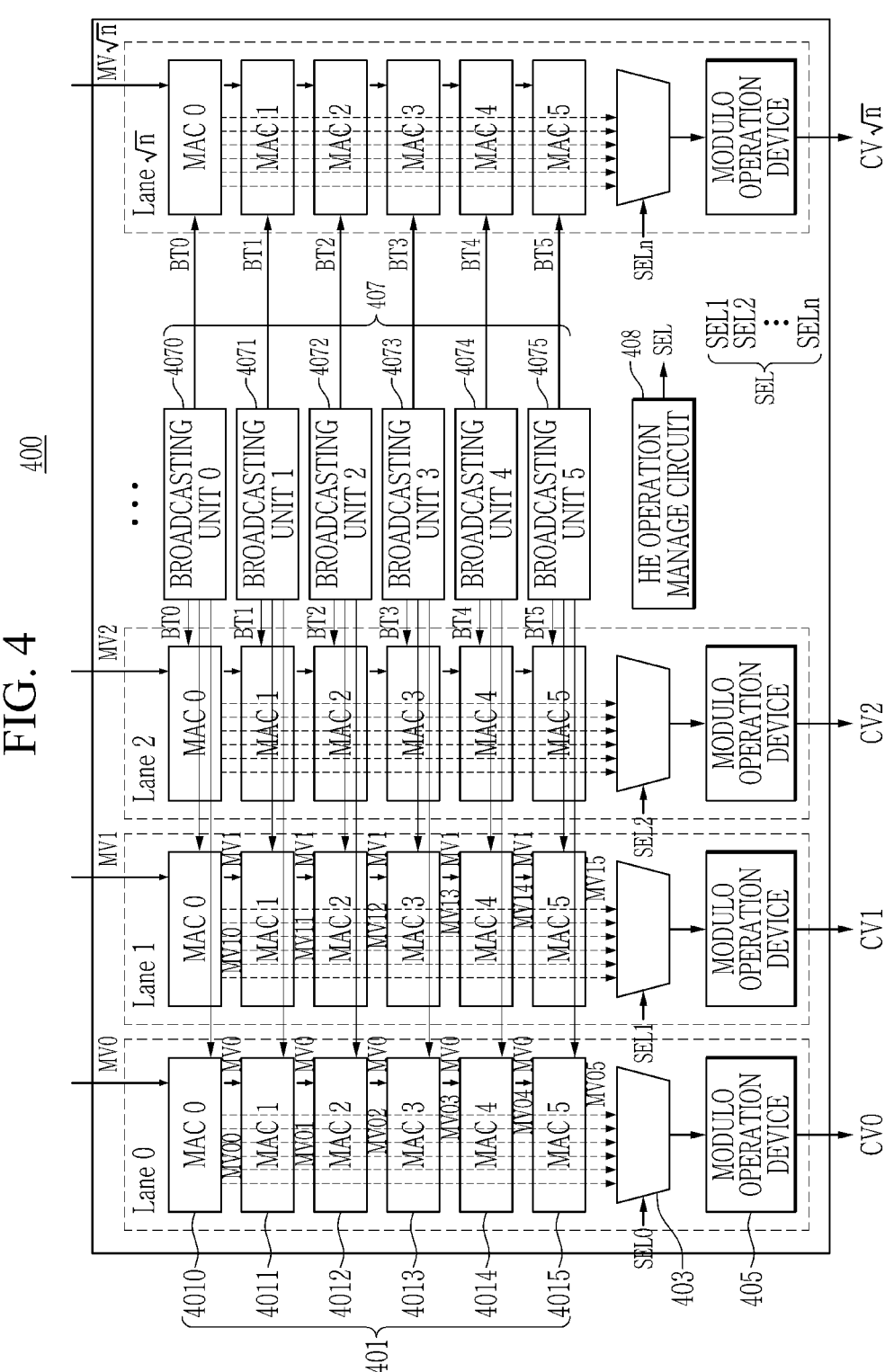
FIG. 4 is a diagram illustrating the structure of a homomorphic operation accelerator according to an embodiment.

FIG. 4 is a diagram illustrating the structure of a homomorphic operation accelerator according to an embodiment.

Figure 5:
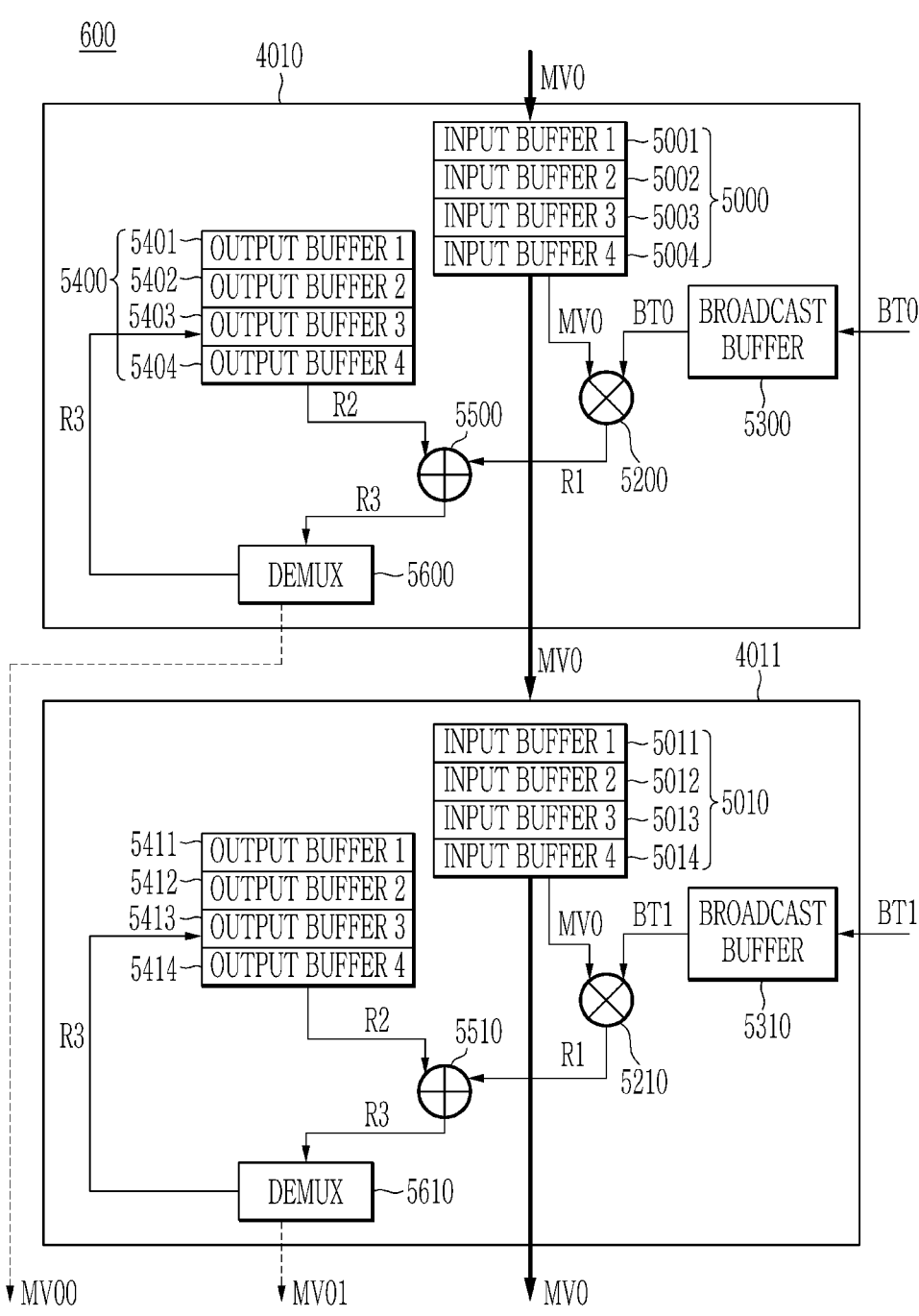
FIG. 5 is a diagram illustrating the structure of a multiply and accumulate (MAC) unit according to an embodiment.
Figure 6:
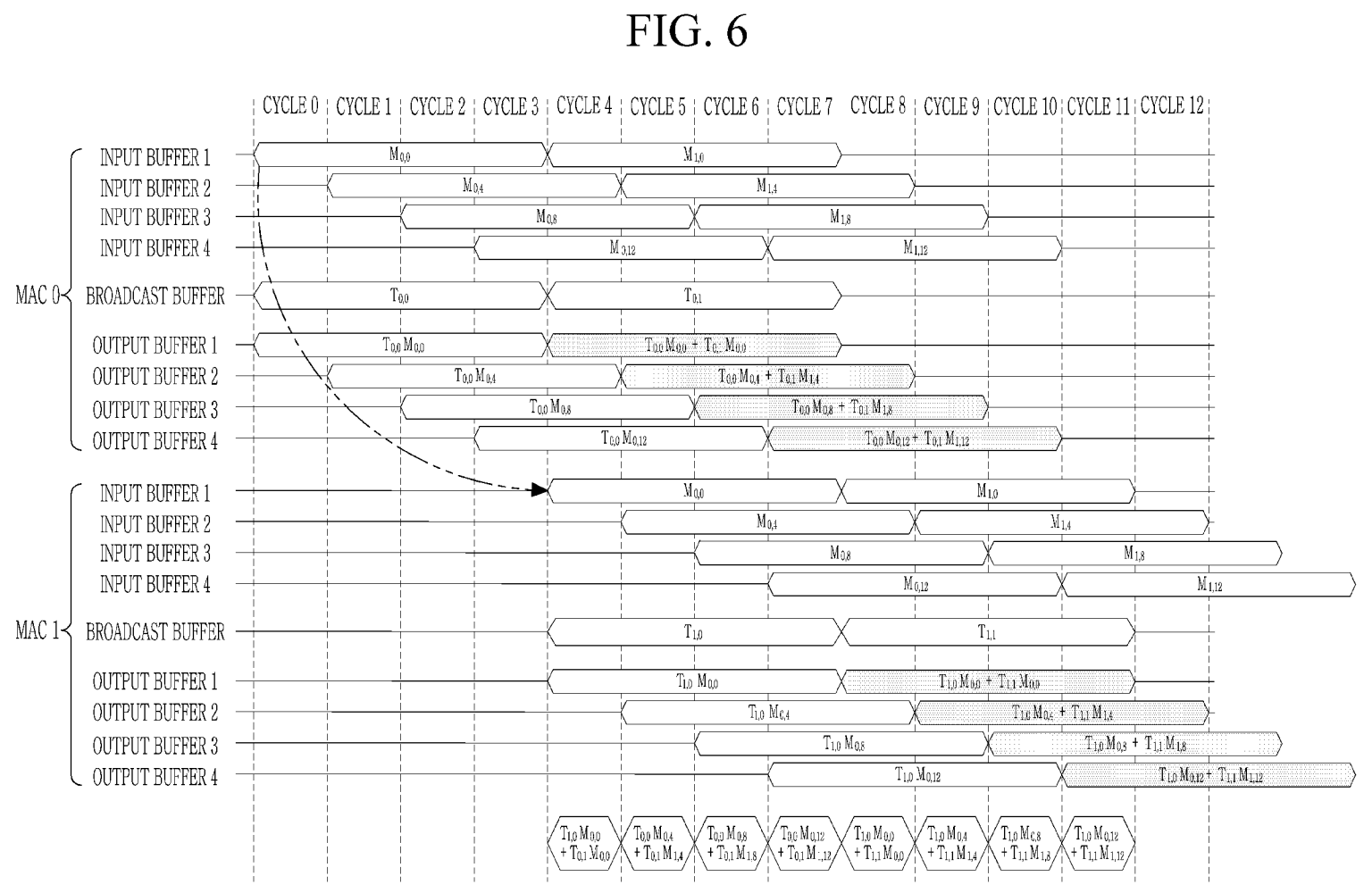

In various embodiments, the homomorphic operation accelerator 400 may perform SIMD by arranging a plurality of operation accelerators in parallel. The operation accelerators connected in parallel are included in one SIMD lane. As shown in FIG. 4, the homomorphic operation accelerator 400 may include a plurality of SIMD lanes (Lane 0, Lane 1, . . . , Lane $\sqrt{n}-1$) disposed in parallel, where the plurality of SIMD lanes are shown arranged vertically. In this case, $\sqrt{n}$ may be an integer. In FIGS. 4 to 6, a first lane, Lane 0, is described as an example, but unless otherwise noted, the description of the first lane Lane 0 may also be applied to the remaining plurality of lanes (Lane 1, . . . , Lane $\sqrt{n}-1$).

In various embodiments, the homomorphic operation accelerator 400 may include a homomorphic operation manage circuit 408, a plurality of MAC units 401, a plurality of broadcasting units 407, a plurality of multiplexers 403, a plurality of modulo operation devices 405, and the like. The number of lanes in the homomorphic operation accelerator 400 and/or the number of MAC units 401 included in one lane may be preset.

In various embodiments, the homomorphic operation manage circuit 408 may control components within the homomorphic operation accelerator 400. The homomorphic operation manage circuit 408 may divide and distribute data to be handled by each lane from the storage device 370. The data distribution method may be preset. In various embodiments, an equation coefficient matrix may include a plurality of coefficients. The homomorphic operation manage circuit 408 may determine the plurality of coefficients corresponding to each of a plurality of lanes according to a predetermined method. The homomorphic operation manage circuit 408 may distribute a plurality of coefficients in the equation coefficient matrix to each of a plurality of lanes according to a predetermined method. For example, when the equation coefficient matrix is a 2*2 matrix, the homomorphic operation manage circuit 408 may distribute elements positioned at (1, 1) and (2, 1) to the first lane, and distribute elements positioned at (1, 2) and (2, 2) to the second lane. That is, elements positioned in the same column may be distributed to the same lane. However, the present disclosure is not limited thereto, and the homomorphic operation manage circuit 408 may appropriately distribute a plurality of coefficients in the equation coefficient matrix to a plurality of lanes according to a predetermined method.

In various embodiments, the homomorphic operation manage circuit 408 may set an operation period of each component in the homomorphic operation accelerator 400. In addition, the homomorphic operation manage circuit 408 may control components in the homomorphic operation accelerator 400 to operate according to the set operation period. For example, the plurality of broadcasting units 407, the plurality of MAC units 401, and the plurality of multiplexers 403 may operate based on the operation period.

The first lane, Lane 0, may include a plurality of MAC units 401 connected in series. For example, the first lane, Lane 0, may include six MAC units MAC 0, MAC 1, . . . , MAC 5, as illustrated. In FIG. 4, it is shown that one lane includes 6 MAC units connected in series, but the present disclosure is not limited thereto, and one lane may include a plurality of MAC units connected in series. Each of a plurality of lanes may include a plurality of MAC units, where a first lane of the plurality of lanes receives a first coefficient of a plurality of coefficients, and a first MAC unit of the plurality of MAC units of the first lane perform a MAC operation on a first element value in the first coefficient including a plurality of element values and a first base conversion value corresponding to the first MAC unit among the base conversion table, to generate a first accumulated output value among the plurality of accumulated output values.

Each of the plurality of MAC units 401 may perform multiplication and accumulation operations on a first coefficient value, MV0, transmitted from the storage device 370, and the base conversion tables BT0, BT1, . . . , BT5 received from each of the plurality of broadcasting units 407. The first coefficient value, MV0, may be an element in an equation coefficient matrix distributed to the first lane, Lane 0, in a predetermined method.

A detailed configuration of each of the plurality of MAC units 401 will be described later with reference to FIG. 5.

In various embodiments, a coefficient value corresponding to lane i among the equation coefficient matrix may be input to an arbitrary lane i (Lane i–1, where i–1 is a positive number less than or equal to $\sqrt{n}$) from the storage device 370 at predetermined intervals. In this case, a period in which the equation coefficient matrix is input may be set based on the number of lanes in the homomorphic operation accelerator 400.

As shown in FIG. 4, only one MAC unit 4010 of an arbitrary lane i Lane i–1 may receive an input of a coefficient value directly from the storage device 370. For example, the first coefficient value, MV0, may be input to the first lane, Lane 0. Specifically, the first MAC unit 4010 may receive an input of the first coefficient value MV0 from the storage device 370. A second MAC unit 4011 may receive the first coefficient value, MV0, delayed by the input buffer in the first MAC unit 4010.

Each of the plurality of broadcasting units 407 may store a base conversion table. In some embodiments, the broadcasting unit 407 may read a base conversion table stored in the storage device 370. The number of broadcasting units 407 may be the same as the number of MAC units included in lane i, Lane i–1. The number of MAC units in the first lane and the number of broadcasting units can also be the same. In FIG. 4, it is shown that the homomorphic operation accelerator 400 includes 6 broadcasting units corresponding to 6 MAC units, but as described above, the present disclosure is not limited thereto.

In various embodiments, each of the broadcasting unit 407 may store a base conversion table for a base, $p_{k/m \times t+i}$ ($0 \le t < m$). The broadcasting unit 407 may broadcast the values of the same base conversion table to lanes according to a period in which the coefficient value, MV0, is input from the storage device 370. Each of the plurality of broadcasting units 407 may broadcast the value of the base conversion table to MAC units having the same position within a plurality of lanes (Lane 0, Lan 1, . . . , Lane $\sqrt{N}-1$). For example, the broadcasting unit 4070 may transmit the base conversion value BT0 corresponding to the first MAC unit 4010. The broadcasting unit 4070 may transmit a base conversion value corresponding to each MAC unit in a plurality of lanes. Further, the broadcasting unit 4070 may transmit the base conversion value, BT0, to a plurality of connected MAC units.

For example, the first MAC unit 4010 may receive the input of the first coefficient value, MV0, from the storage device 370, and may receive the input of the first base conversion value, BT1, from the broadcasting unit 4070. While the first MAC unit 4010 generates a first accumulated output value MV00, the second MAC unit 4011 may receive the first coefficient value, MV0, from the first MAC unit 4010, and may receive a second base conversion value, BT2, from the broadcasting unit 4070. After a predetermined period, the accumulated output values (MV00, MV01, MV02, MV03, MV04, MV05) of the plurality of MAC units 401 in the first lane, Lane 0, may be input to the multiplexer 403. A multiplexer 403 may receive a plurality of accumulated output values from each of a plurality of MAC units 401 in the first lane, and may select one of the plurality of accumulated output values by the homomorphic operation manage circuit, where the homomorphic operation manage circuit can distribute a plurality of coefficients in the equation coefficient matrix to each of a plurality of lanes according to a predetermined method. For example, the first MAC unit 4010 may generate a first accumulated output value, MV00, by performing a MAC operation on the first coefficient value, MV0, and the first base conversion value, BT1.

In various embodiments, the multiplexer 403 may receive an input of accumulated output values from the plurality of MAC units 401 and transmit them to the modulo operation device 405. The accumulated output values may be a summation of separate values.

In some embodiments, the multiplexer 403 may select one of the plurality of inputs and output it to the modulo operation device 405, according to a selection signal SEL0 from the homomorphic operation manage circuit 408.

In various embodiments, the modulo operation device 405 may perform a modulo operation on each of a plurality of accumulated output values received from the multiplexer 403. Specifically, the modulo operation device 405 may obtain a remainder obtained by dividing the accumulated output value by a new base, $p_i$. For example, the modulo operation device 405 may perform the modulo operation on each of the first accumulated output value MV00 from the first MAC unit 4010, the second accumulated output value MV01 from the second MAC unit 4011, the third accumulated output value MV02 from the third MAC unit 4012, the fourth accumulated output value MV03 from the fourth MAC unit 4013, the fifth accumulated output value MV04 from the fifth MAC unit 4014, and the sixth accumulated output value MV05 from the sixth MAC unit 4015, respectively, to calculate a first result value, CV0, based on the base, $p_i$. In this case, the first result value, CV0, may be a value obtained by converting the first coefficient value, MV0, based on the base $q_i$ to be based on the base $p_i$.

In various embodiments, the output of the modulo operation device 405 may be programmed into the storage device 370. The plurality of MAC units 401 may share a modulo operation device 405. Thus, the number of operation devices required per MAC unit may be reduced.

FIG. 5 is a diagram illustrating the structure of a multiply and accumulate (MAC) unit according to an embodiment. FIG. 6 is a diagram illustrating an operation of a homomorphic operation accelerator according to an embodiment.

Specifically, FIG. 5 is a diagram illustrating the configuration of the first MAC unit 4010 and the second MAC unit 4011 in detail. As shown in FIG. 5, the first MAC unit 4010 may include four input buffers 5001, 5002, 5003, and 5004, a broadcasting buffer 5300, a multiplier 5200, four output buffers 5401, 5402, 5403, and 5404, an adder 5500, and a demultiplexer 5600. Further, the second MAC unit 4011 may include four input buffers 5011, 5012, 5013, and 5014, a broadcasting buffer 5310, a multiplier 5210, four output buffers 5411, 5412, 5413, and 5414, an adder 5510, and a demultiplexer 5610. Because the configuration of the second MAC unit 4011 is similar to that of the first MAC unit 4010, the description of the first MAC unit 4010 may also be applied to the second MAC unit 4011 unless otherwise noted.

In various embodiments, each of a plurality of input buffers 5000 may receive data MV0 from the storage device 370 and temporarily store the received data, MV0. Each of the plurality of input buffers 5011 may transmit an input value to the next MAC unit after a predetermined time.

In various embodiments, the broadcasting buffer 5300 may receive the base conversion table BT0 from the broadcasting unit 4070 and temporarily store the received base conversion table BT0. The broadcasting buffer 5300 may transmit a new base conversion value to the multiplier 5200 at each predetermined operation period. For example, the predetermined operation period may be 4 cycles. The homomorphic operation manage circuit 408 may determine an operation period based on the number of input buffers and output buffers in the MAC unit 4010.

In various embodiments, the multiplier 5200 may multiply the coefficient value received from the input buffer 5000 by the base conversion value received from the broadcasting buffer 5300. The multiplier 5200 may transmit a multiplication value, R1, to the adder 5500. Here, the multiplication value, R1, may be a coefficient value*a base conversion value.

In various embodiments, the adder 5500 may add the multiplication value, R1, received from the multiplier 5200 and a temporary output value, R2, received from the output buffer 5400. The adder 5500 may transmit an addition value, R3, to the demultiplexer 5600. Here, the addition value, R3, may be the multiplication value R1+the temporary output value R2.

In various embodiments, the demultiplexer 5600 may output an output to the multiplexer (403 in FIG. 4) when accumulation is performed a predetermined number of times. For example, the demultiplexer 5600 may determine whether to transmit an output to the multiplexer 403 or the output buffer 5400 according to the control of the homomorphic operation manage circuit (408 in FIG. 4). Meanwhile, the demultiplexer 5600 may transmit the temporary output value, R2, as the addition value, R3, to the output buffer 5400 when accumulation is not performed a predetermined number of times. For example, when all the coefficients of I remaining polynomials are not accumulated, the demultiplexer 5600 may transmit an output to the output buffer 5400 when accumulation is not performed a predetermined number of times, and may transmit the output to the output buffer 5400 until all coefficients of the I remaining polynomials are accumulated. The homomorphic operation manage circuit 408 can set an operation period of the broadcasting unit 4070 based on the number of the plurality of input buffers 5000 and the number of the plurality of output buffers 5400. The broadcasting unit 4070 can update the base conversion value based on the operation period.

The output buffer 5400 may store a temporary output value in which all coefficients of I remaining polynomials are not accumulated.

The configuration in the MAC unit will be described with reference to FIG. 6 together. FIG. 6 is a timing diagram illustrating operations of the first MAC unit 4010 and the second MAC unit 4011 in the case of having an equation coefficient matrix M and a base conversion table matrix T according to Equation 3. The equation coefficient matrix M may be a 2*16 matrix, and the base conversion table matrix T may be an 8*2 matrix.

$$[\text{Equation 3}]$$
$$M=$$

| $M_{0,0}$ | $M_{0,1}$ | $M_{0,2}$ | $M_{0,3}$ | $M_{0,4}$ | $M_{0,5}$ | $M_{0,6}$ | $M_{0,7}$ | $M_{0,8}$ | $M_{0,9}$ | $M_{0,10}$ | $M_{0,11}$ | $M_{0,12}$ | $M_{0,13}$ | $M_{0,14}$ | $M_{0,15}$ |
| $M_{1,0}$ | $M_{1,1}$ | $M_{1,2}$ | $M_{1,3}$ | $M_{1,4}$ | $M_{1,5}$ | $M_{1,6}$ | $M_{1,7}$ | $M_{1,8}$ | $M_{1,9}$ | $M_{1,10}$ | $M_{1,11}$ | $M_{1,12}$ | $M_{1,13}$ | $M_{1,14}$ | $M_{1,15}$ |

$$T=$$

| $T_{0,0}$ | $T_{0,1}$ |
| $T_{1,0}$ | $T_{1,1}$ |
| $T_{2,0}$ | $T_{2,1}$ |
| $T_{3,0}$ | $T_{3,1}$ |
| $T_{4,0}$ | $T_{4,1}$ |
| $T_{5,0}$ | $T_{5,1}$ |

FIG. 6 is a timing diagram illustrating the plurality of input buffers 5000, the broadcast buffer 5300, and the plurality of output buffers 5400 in the first MAC unit 4010, and a plurality of input buffers 5010 in the second MAC unit 4011, a broadcast buffer 5310, and data input or stored in a plurality of output buffers 5410. Hereinafter, the first MAC unit 4010 and the second MAC unit 4011 have been described as examples, but descriptions of the first MAC unit 4010 and the second MAC unit 4011 may be applied to all MAC units in the homomorphic operation accelerator 400, unless otherwise noted.

In various embodiments, the manner in which the homomorphic operation manage circuit 408 receives an input of data in the equation coefficient matrix from the storage device 370 may be set in advance. Here, in the homomorphic operation manage circuit 408, the first column ($M_{0,0}$, $M_{1,0}$), the fifth column ($M_{0,4}$, $M_{1,4}$), the ninth column ($M_{0,8}$, $M_{1,8}$), and the thirteenth column ($M_{0,12}$, $M_{1,12}$) may be set to be input in the first lane Lane 0, the second column ($M_{0,1}$, $M_{1,1}$), the sixth column ($M_{0,5}$, $M_{1,5}$), the tenth column ($M_{0,9}$, $M_{1,9}$), and the fourteenth column ($M_{0,13}$, $M_{1,13}$) may be set to be input in the second lane Lane 1, the third column ($M_{0,2}$, $M_{1,2}$), the seventh column ($M_{1,6}$, $M_{1,6}$), the eleventh column ($M_{0,10}$, $M_{1,10}$), and the fifteenth column ($M_{0,14}$, $M_{1,14}$) may be set to be input in the third lane Lane 2, and the fourth column ($M_{0,3}$, $M_{1,3}$), the eighth column ($M_{1,7}$, $M_{1,7}$), the twelfth column ($M_{0,11}$, $M_{1,11}$), and the sixteenth column ($M_{0,15}$, $M_{1,15}$) may be set to be input in the fourth lane Lane 3. For example, the first lane Lane 0 may input in the order of the first element value $M_{0,0}$ of the first row and the first column, the second element value $M_{0,4}$ of the first row and the fifth column, the third element value $M_{0,8}$ of the first row and the ninth column, the fourth element value $M_{0,12}$ of the first row and the thirteenth column, the fifth element value $M_{1,0}$ of the second row and the first column, the sixth element value $M_{1,4}$ of the second row and the fifth column, the seventh element value $M_{1,8}$ of the second row and the ninth column, and the eighth element value $M_{1,12}$ of the second row and the thirteenth column. The plurality of element values may be sequentially input to the input buffers 5001, 5002, 5003, and 5004 in the MAC unit 4010, and to the input buffers 5411, 5412, 5413, and 5414 in the MAC unit 4011.

In this time, the homomorphic operation manage circuit 408 may determine that the operation period of the homomorphic operation accelerator 400 is 4 cycles. Accordingly, a new element value may be input to one input buffer 5001 every 4 cycles. In addition, the broadcast buffer 5300 may be updated with a new base conversion value every 4 cycles.

The first MAC unit 4010 may receive the input of the coefficient matrix MV0 from the storage device 370.

In a first cycle CYCLE 0, the first element value, $M_{0,0}$, may be input to the first input buffer 5001 from the storage device 370.

A base conversion table corresponding to the first MAC unit 4010 may be the first row ($T_{0,0}$, $T_{0,1}$). In the first cycle CYCLE 0, the first base conversion value $T_{0,0}$ may be input to the first broadcast buffer 5300 from the broadcast unit 4070.

In the first cycle CYCLE 0, the multiplier 5200 may receive an input of the first element value, $M_{0,0}$, from the first input buffer 5001 and the first base conversion value, $T_{0,0}$, from the first broadcast buffer 5300, perform multiplication, and generate the first multiplication value, $T_{0,0}M_{0,0}$. The demultiplexer 403 may transmit the first multiplication value, $T_{0,0}M_{0,0}$, to the first output buffer 5401, because the operation has not yet been performed a predetermined number of times.

In a second cycle CYCLE 1, a second element value, $M_{0,4}$, may be input to the second input buffer 5002 from the storage device 370.

In the first broadcast buffer 5300, the first base conversion value $T_{0,0}$ input from the broadcast unit 4070 during the first cycle CYCLE 0 may be stored.

In the second cycle CYCLE 1, the multiplier 5200 may receive an input of the second element value $M_{0,4}$ from the second input buffer 5002 and the first base conversion value $T_{0,0}$ from the first broadcast buffer 5300, perform multiplication, and generate the second multiplication value $T_{0,0}M_{0,4}$. The demultiplexer 403 may transfer the second multiplication value $T_{0,0}M_{0,4}$ to the second output buffer 5402, because the operation has not yet been performed a predetermined number of times.

In a third cycle CYCLE 2, a third element value $M_{0,8}$ may be input to the third input buffer 5003 from the storage device 370.

In the first broadcast buffer 5300, the first base conversion value $T_{0,0}$ input from the broadcast unit 4070 during the first cycle CYCLE 0 may be stored.

In the third cycle CYCLE 2, the multiplier 5200 may receive an input of the third element value, $M_{0,8}$, from the third input buffer 5003 and the first base conversion value, $T_{0,0}$, from the first broadcast buffer 5300, perform multiplication, and generate the third multiplication value, $T_{0,0}M_{0,8}$. The demultiplexer 5600 may transfer the third multiplication value $T_{0,0}M_{0,8}$ to the third output buffer 5403, because the operation has not yet been performed a predetermined number of times.

In a fourth cycle CYCLE 3, a fourth element value $M_{0,12}$ may be input to the fourth input buffer 5004 from the storage device 370.

In the first broadcast buffer 5300, the first base conversion value $T_{0,0}$ input from the broadcast unit 4070 during the first cycle CYCLE 0 may be stored.

In the fourth cycle CYCLE 3, the multiplier 5200 may receive an input of the fourth element value $M_{0,12}$ from the fourth input buffer 5004 and the first base conversion value, $T_{0,0}$, from the first broadcast buffer 5300, perform multiplication, and generate the fourth multiplication value $T_{0,0}$ $M_{0,12}$. The demultiplexer 5600 may transfer the fourth multiplication value $T_{0,0}M_{0,12}$ to the fourth output buffer 5404, because the operation has not yet been performed a predetermined number of times.

In various embodiments, the first broadcast buffer 5300 may be updated in a fifth cycle CYCLE 4 after a predetermined delay time of 4 cycles from the first cycle CYCLE 0. The second base conversion value, $T_{0,1}$, may be input from the broadcast unit 4070. In addition, in the fifth cycle CYCLE 4, the coefficient matrix, MV0, may be transmitted from the first MAC unit 4010 to the second MAC unit 4011.

In the fifth cycle CYCLE 4, a fifth element value $M_{1,0}$ may be input to the first input buffer 5001 from the storage device 370.

In the fifth cycle CYCLE 4, the multiplier 5200 may receive an input of the fifth element value $M_{1,0}$ from the first input buffer 5001 and the second base conversion value $T_{0,1}$ from the first broadcast buffer 5300, perform multiplication, and generate the fifth multiplication value $T_{0,1}M_{0,0}$). The adder 5500 may add the first multiplication value $T_{0,0}M_{0,0}$ and the fifth multiplication value $T_{0,1}M_{0,0}$) from the first output buffer 5401, and transmit a first addition value $T_{0,0}M_{0,0}+T_{0,1}M_{0,0}$ to the demultiplexer 5600. Because the demultiplexer 403 has performed the operation a predetermined number of times, the first addition value $T_{0,0}M_{0,0}+T_{0,1}M_{0,0}$ may be transmitted to the multiplexer 403.

At the same time, in the fifth cycle CYCLE 4, the first element value $M_{0,0}$ may be input to the first input buffer 5011 of the second MAC unit 4011.

A base conversion table corresponding to the second MAC unit 4011 may be a second row $(T_{1,0}, T_{1,1})$. In the fifth cycle CYCLE 4, a first base conversion value $T_{1,0}$ may be input to the second broadcast buffer 5310 from the broadcast unit 4070.

In the fifth cycle CYCLE 4, the multiplier 5210 may receive an input of the first element value $M_{0,0}$ from the first input buffer 5011 and the first base conversion value $T_{1,0}$ from the second broadcast buffer 5310, perform multiplication, and generate the first multiplication value $T_{1,0}M_{0,0}$. The demultiplexer 403 may transmit the first multiplication value $T_{0,0}M_{0,0}$ to the first output buffer 5411, because the operation has not yet been performed a predetermined number of times.

After a sixth cycle CYCLE 5, the operation of the plurality of MAC units 401 may be similar to the operation of the first MAC unit 4010 and the second MAC unit 4011 in the first cycle CYCLE 0 to the fifth cycle CYCLE 4. The second MAC unit 4011 may transmit the first addition value $T_{1,0}M_{0,0}+T_{1,1}M_{0,0}$ to the multiplexer 403 in a seventh cycle CYCLE 8.

In summary, an input into the first MAC unit 4010 may be transmitted to the next second MAC unit 4011 after having a predetermined delay time (here, 4 cycles) through the input buffer.

Due to the delay time, a time gap may occur between the time the accumulated output value of MAC i is output and the time the accumulated output value of MAC i+1 is output. Accordingly, it may be possible to calculate the accumulated output values of the plurality of MAC units 401 through one modulo operation device 405.

During the delay time, one MAC unit 4010 may receive an input of different element values of the remaining polynomial from the storage device 370, and receive an input of one base conversion value from the broadcasting unit 4070. Scheduling input information in this way allows element values of the remaining polynomials to be converted using the same base conversion value to be supplied at once.

Accordingly, the homomorphic encryption accelerator 400 according to an embodiment may reduce the required memory unit bandwidth by reusing input data used in other MAC units when performing matrix multiplication operations on a finite field included in the fast base conversion in parallel, and may reduce hardware costs by having one MAC unit perform operations while another MAC unit is performing operations using a time multiplexing method.

Through the above-described operation, the conversion for a new base is completed as much as the number of MACs (6 in FIG. 4) in one lane. If a conversion for a new base exceeding the number of MACs is required, it is possible to input the base conversion table corresponding to the broadcasting unit and repeat it again.

Figure 7:
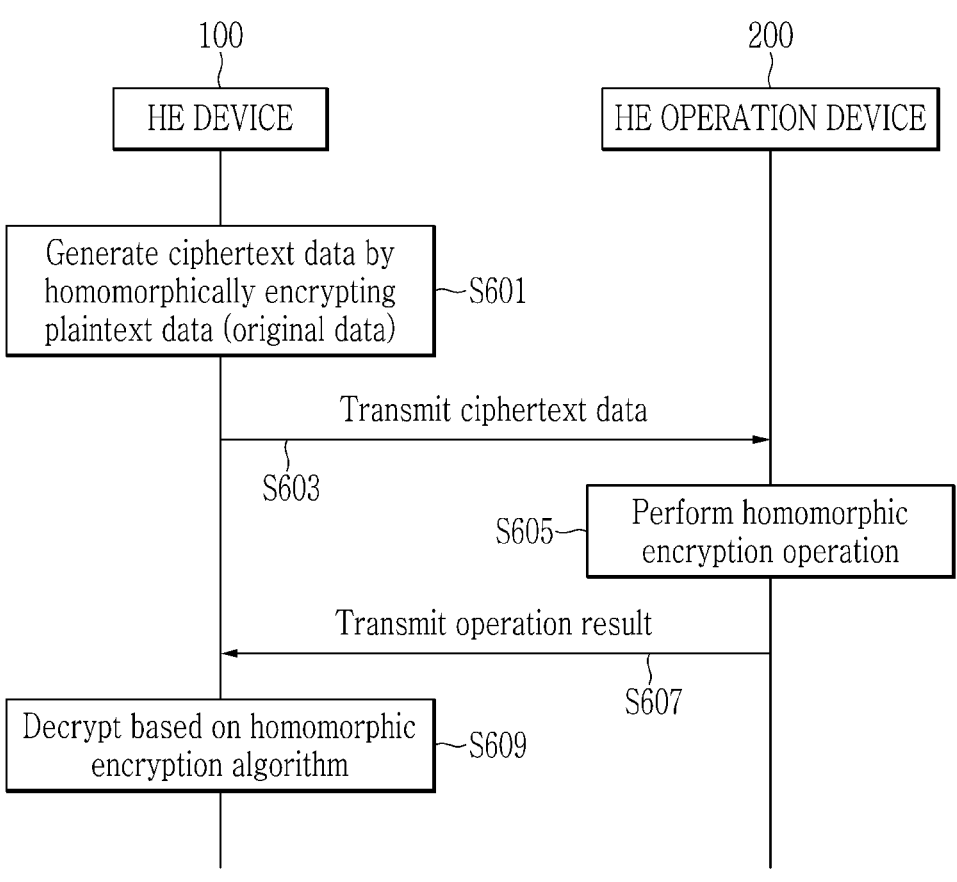
FIG. 7 is a flowchart illustrating an operating method of an encryption system according to an embodiment.

FIG. 7 is a flowchart illustrating an operating method of an encryption system according to an embodiment.

In various embodiments, the homomorphic encryption device 100 generates ciphertext data by homomorphically encrypting plaintext data (original data) (S601).

In various embodiments, the homomorphic encryption device 100 transmits the generated ciphertext data to the homomorphic encryption server 200 (S603).

For example, the homomorphic encryption device 100 may transmit ciphertext data to the homomorphic encryption server 200 to receive service from the homomorphic encryption server 200.

In various embodiments, the homomorphic encryption server 200 performs a homomorphic encryption operation (S605).

For example, the homomorphic encryption server 200 may perform an operation on ciphertext data received from the homomorphic encryption device 100 to provide a service.

For example, the homomorphic encryption server 200 may perform a predetermined operation on the first ciphertext data represented as the first base from a first homomorphic encryption device. The predetermined operation may be performed using the second base different from the first base of the first ciphertext data. In order to perform an operation between ciphertext data expressed in different bases, the homomorphic encryption server 200 may perform conversion to unify bases of operation targets.

In various embodiments, the homomorphic encryption server 200 transmits the operation result of the homomorphic encryption operation (S607).

In various embodiments, the homomorphic encryption device 100 decrypts the operation result based on the homomorphic encryption algorithm (S609).

For example, the homomorphic encryption device 100 may receive a ciphertext operation result and decrypt the received operation result using a private key. Accordingly, the homomorphic encryption device 100 may receive a service from the homomorphic encryption server 200.

Figure 8:
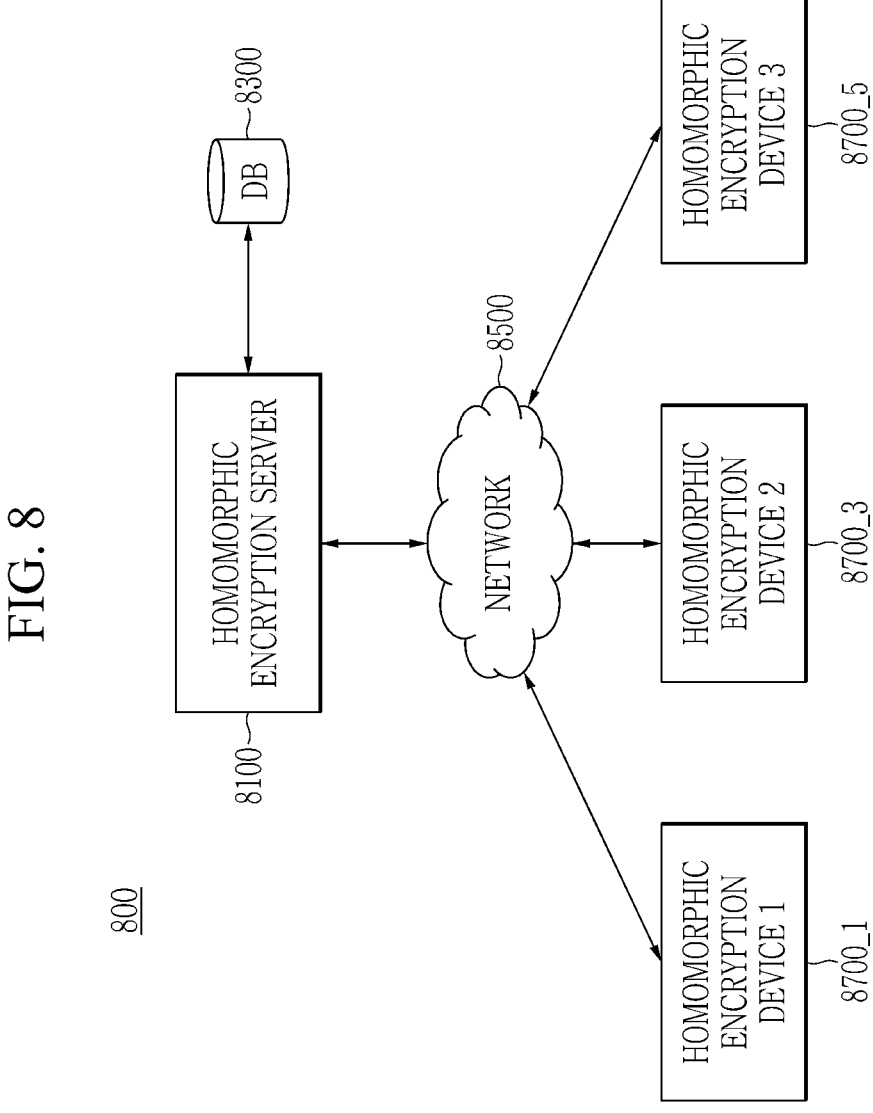
FIG. 8 is a block diagram illustrating an operating system for homomorphic encryption including a homomorphic operation device according to an embodiment.

FIG. 8 is a block diagram illustrating a homomorphic operation system including a homomorphic operation device according to an embodiment.

Referring to FIG. 8, a homomorphic encryption system 800 includes a homomorphic encryption server 8100, a database 8300, a communication network 8500, and homomorphic encryption devices 8700-1, 8700-3, and 8700-5.

In various embodiments, the homomorphic encryption server 8100 may correspond to the homomorphic encryption server 200 described above with reference to FIG. 1.

Each of the homomorphic encryption devices 8700-1, 8700-3, and 8700-5 may correspond to the homomorphic encryption device 100. The homomorphic encryption devices 8700-1, 8700-3, and 8700-5 may also be referred to as client devices, and are computing devices or communication terminals having a communication function, such as a mobile phone, a smart phone, a tablet PC, a mobile internet device (MID), an internet tablet, an Internet of Things (IoT) device, or a wearable computer, but the present disclosure is not limited thereto.

In various embodiments, the communication network 8500 includes a local area network (LAN), a wide area network (WAN), world wide web (WWW), a wired/wireless data communication network, a telephone network, a wired/wireless television communication network, and the like. Wireless communication networks may include any one of 3G, 4G, 5G, 3GPP (3rd Generation Partnership Project), long term evolution (LTE), world interoperability for microwave access (WIMAX), Wi-Fi, bluetooth communication, infrared communication, ultrasonic communication, visible light communication (VLC), and LiFi, but the present disclosure is not limited thereto.

Figure 9:
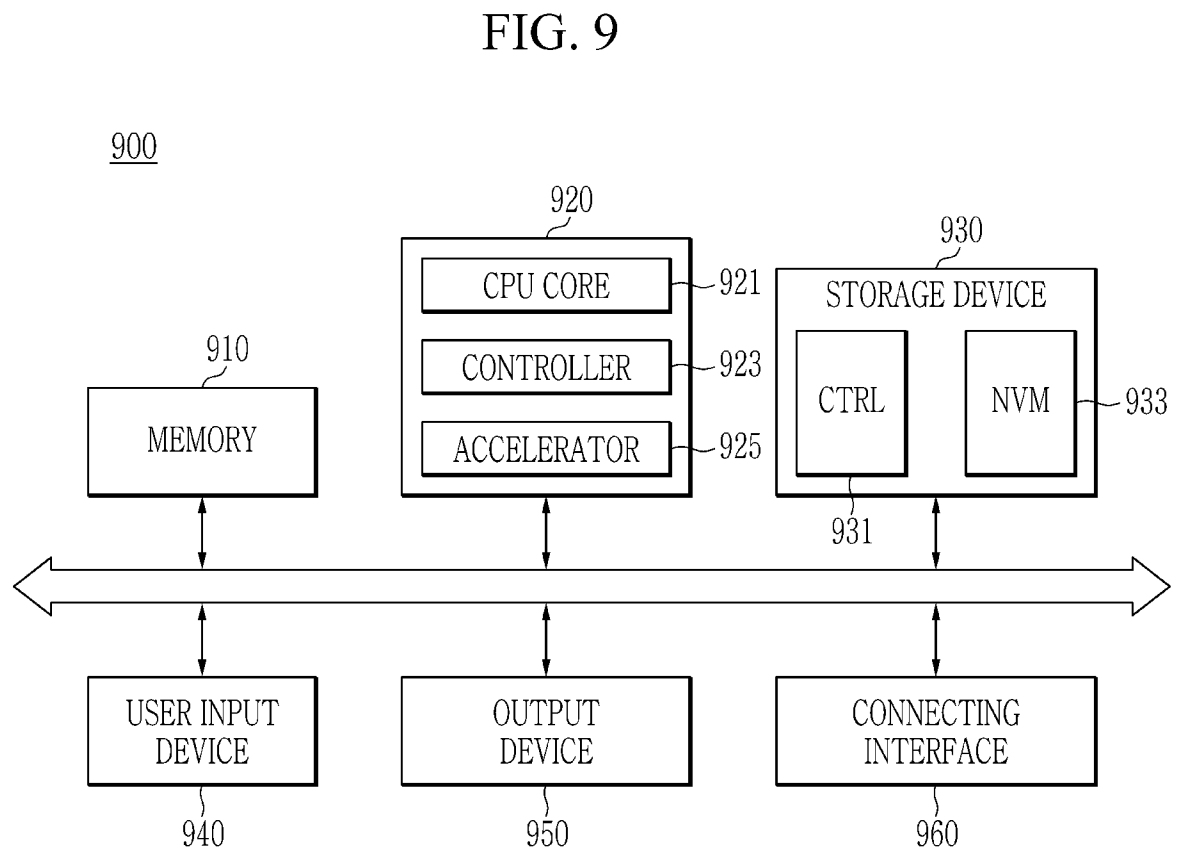

FIG. 9 is a diagram illustrating an electronic device 900 to which a storage device according to an embodiment is applied. The electronic device 900 shown in FIG. 9 may be a mobile system, such as a portable communication terminal (mobile phone), a smart phone, a tablet personal computer (PC), a wearable device, a healthcare device, or an Internet of things (IoT) device. However, the electronic device 900 of FIG. 9 is not necessarily limited to a mobile system and may be a PC, a laptop computer, a server, a media player, or an automotive device such as a navigation device.

Referring to FIG. 9, the electronic device 900 may include a main processor 920, a memory 910, and a storage device 930. In addition, the electronic device 900 may include at least one of a user input device 940, an output device 950, and a connecting interface 960.

In various embodiments, the main processor 920 may control all the operations of the electronic device 900, and more specifically, operations of other constituent elements included in the electronic device 900. The main processor 920 may be implemented as a general-purpose processor, a dedicated processor, or an application processor.

In various embodiments, the main processor 920 may include one or more CPU cores 921. Further, the main processor 920 may further include a controller 923 for controlling the memory 910 or the storage device 930. In an embodiment, the main processor 920 may further include an accelerator 925, which is a dedicated circuit for a high-speed data operation, such as artificial intelligence (AI) data operation.

In various embodiments, the accelerator 925 may include a graphics processing unit (GPU), a neural processing unit (NPU), or a data processing unit (DPU). The accelerator 925 may be implemented as the homomorphic encryption accelerator described in FIGS. 1 to 7. The accelerator 925 may be implemented as a separate chip physically separate from the other components of the main processor 920.

In various embodiments, the accelerator 925 may include a plurality of MAC units connected in series. Accordingly, the number of MAC units that may be processed per operator with one module may be increased. In addition, it is possible to reduce the number of times of reading data by transmitting the input value read from the memory with a predetermined time delay between the plurality of MAC units. In addition, the modulo calculator may calculate operation values received from a plurality of MAC units without interfering with each other, thereby reducing time required for operation.

In various embodiments, the accelerator 925 may reduce a homomorphic encryption operation time.

Also, the accelerator 925 may reduce energy consumption during an operation process by using input data read from a memory multiple times.

In various embodiments, the memory 910 may be used as a main memory device of the electronic device 900. Although the memory 910 may include a volatile memory, such as SRAM or DRAM, but may also include a non-volatile memory, such as a flash memory, PRAM, or RRAM. The memory 910 may also be implemented in the same package as the main processor 920.

In various embodiments, the storage device 930 may be implemented as a non-volatile storage device that stores data regardless of whether power is supplied thereto. The storage device 930 may have a relatively large storage capacity compared to the memory 910. The storage device 930 may include a memory controller 931, and a non-volatile memory (NVM) 933 that stores data via the control of the memory controller 931. The NVM 933 may include a V-NAND (Vertical NAND) flash memory having a 2-dimensional (2D) structure or a 3-dimensional (3D) structure, but the NVM 933 may include other types of NVM, such as PRAM or RRAM. Furthermore, the storage device 930 may be implemented to perform an encryption/decryption operation using a homomorphic encryption algorithm.

In various embodiments, the storage device 930 may be physically separated from the main processor 920 and included in the electronic device 900. In addition, the storage device 930 may be implemented in the same package as the main processor 920. In addition, the storage device 930 may be a type of solid state device (SSDs) or memory card, and be removably combined with other constituent elements of an electronic device 1000 through an interface, such as the connecting interface 960. The storage device 930 may be a device to which a standard protocol, such as a universal flash storage (UFS), an embedded multi-media card (eMMC), or a non-volatile memory express (NVMe), is applied, without being limited thereto.

In various embodiments, the user input device 940 may receive various types of data input by a user of the electronic device 900, which may include a touch pad, a keypad, a keyboard, a mouse, or a microphone.

In various embodiments, the user input device 940 may capture still images or moving images. The user input device 940 may include a camera, a camcorder, or a webcam. The user input device 940 may detect various types of physical quantities, which may be obtained from the outside of the electronic device 900, and convert the detected physical quantities into electrical signals. The user input device 940 may include a temperature sensor, a pressure sensor, an illuminance sensor, a position sensor, an acceleration sensor, a biosensor, or a gyroscope sensor.

The output device 950 may be a display or a speaker that respectively outputs visual information and auditory information to the user of the electronic device 900.

A communication device may transmit and receive wired/wireless signals between other devices outside the electronic device 900 according to various communication protocols. The communication device may include an antenna, a transceiver, or a modem.

The connecting interface 960 may provide connection between the electronic device 900 and an external device, which is connected to the electronic device 900 and capable of transmitting and receiving data to and from the electronic device 900. The connection interface 960 may be implemented by using various interface schemes, such as advanced technology attachment (ATA), serial ATA (SATA), external SATA (e-SATA), small computer small interface (SCSI), serial attached SCSI (SAS), Peripheral Component Interconnection (PCI), PCIe (PCI express), NVMe, IEEE 1394, universal serial bus (USB), secure digital (SD) card, multi-media card (MMC), eMMC, UFS, embedded Universal Flash Storage (eUFS), compact flash (CF) card interface.

What is claimed is:

1. A homomorphic operation system, comprising:
a homomorphic encryption device outputting a first ciphertext data generated based on a first base; and
a homomorphic encryption server comprising a storage device storing a base conversion table for converting ciphertext data based on the first base into a ciphertext data based on a second base and the first ciphertext data received from the homomorphic encryption device, and
a homomorphic encryption operation device performing a predetermined operation using the base conversion table on the first ciphertext data to convert the first ciphertext data into a second ciphertext data based on the second base.

2. The homomorphic operation system of claim 1, wherein:
the first ciphertext data includes a plurality of coefficients,
the homomorphic encryption operation device comprises:
a plurality of lanes receiving the plurality of coefficients, performing multiply and accumulate (MAC) operations to generate a plurality of accumulated output values, and performing modulo operations for each of the plurality of the accumulated output values to generate result values corresponding to the coefficients of the second ciphertext data;
a plurality of broadcasting units supplying a base conversion value corresponding to each of the plurality of coefficients of the first ciphertext data based on the base conversion table; and
a homomorphic operation manage circuit setting operation periods of the plurality of broadcasting units.

3. The homomorphic operation system of claim 2, wherein:
the homomorphic operation manage circuit determines the plurality of coefficients corresponding to each of the plurality of lanes according to a predetermined method,
each of the plurality of lanes includes a plurality of MAC units, a first lane of the plurality of lanes receives a first coefficient of the plurality of coefficients, and a first MAC unit of the plurality of MAC units of the first lane perform a MAC operation on a first element value in the first coefficient including a plurality of element values and a first base conversion value corresponding to the first MAC unit among the base conversion table, to generate a first accumulated output value among the plurality of accumulated output values.

4. The homomorphic operation system of claim 3, wherein:
the number of MAC units in the first lane and the number of the plurality of broadcasting units are the same.

5. The homomorphic operation system of claim 3, wherein:

the first lane comprises:
a multiplexer that receives a plurality of accumulated output values from each of a plurality of MAC units in the first lane, and selects one of the plurality of accumulated output values by the homomorphic operation manage circuit; and
a modular operation device coupled to the multiplexer to perform a modular operation on each of the plurality of accumulated output values.

6. The homomorphic operation system of claim 5, wherein:
the first MAC unit comprises:
a plurality of input buffers sequentially receiving and storing a plurality of element values in the first coefficient from the storage device;
a broadcasting buffer receiving the first base conversion value corresponding to the first MAC unit from the broadcasting unit; and
a multiplier coupled to the plurality of input buffers and the broadcasting buffer to generate a multiplication value by multiplying the plurality of element values and the first base conversion value.

7. The homomorphic operation system of claim 6, wherein:
the multiplication value includes a first multiplication value obtained by multiplying the first element value among a plurality of element values in the first coefficient and the first base conversion value, and the multiplier generates a second multiplication value by multiplying a second element value among the plurality of element values and the first base conversion value,
the first MAC unit further comprises:
a plurality of output buffers storing multiplication values from the multiplier; and
an adder connected to the plurality of output buffers and the multiplier, and generating a third addition value by adding the first multiplication value and the second multiplication value.

8. The homomorphic operation system of claim 7, wherein:
the first MAC unit further comprises a demultiplexer connected to the adder and transferring the third addition value to the output buffer or the multiplexer under control of the homomorphic operation manage circuit.

9. The homomorphic operation system of claim 7, wherein:
a second MAC unit of the plurality of MAC units receives the first coefficient from the input buffer of the first MAC unit,
the second MAC unit performs a MAC operation on the second base conversion value corresponding to the second MAC unit among the base conversion table and the second element value in the first coefficient.

10. The homomorphic operation system of claim 7, wherein:
the homomorphic operation manage circuit sets an operation period of the broadcasting unit based on the number of the plurality of input buffers and the number of the plurality of output buffers.

11. The homomorphic operation system of claim 7, wherein:
the broadcasting unit updates the base conversion value based on the operation period.

12. The homomorphic operation system of claim 11, wherein:
the first accumulated output value is a value obtained by adding all values obtained by multiplying each of a plurality of element values in the first coefficient by the first base conversion value.

13. An operating method of a homomorphic operation system, comprising:

receiving a first ciphertext data generated based on a first base; and performing a predetermined operation to convert the first ciphertext data into a second ciphertext data based on a second base, based on a base conversion table for converting ciphertext data based on the first base into ciphertext data based on the second base, the predetermined operation comprising multiply-accumulate operations using base conversion values from a base conversion table and modulo operations to generate coefficients of the second ciphertext data, the base conversion table comprising numerical values for mathematical base conversion of ciphertext coefficients.

14. The operating method of the homomorphic operation system of claim 13, wherein:

the first ciphertext data comprises a plurality of coefficients, the performing of the predetermined operation comprises:

generating a plurality of accumulated outputs by performing a MAC operation on a base conversion value corresponding to each of the plurality of coefficients of the first ciphertext data among the base conversion table and the plurality of coefficients; and generating a result value corresponding to the coefficient of the second ciphertext data by performing a modular operation on each of the plurality of accumulated output values.

15. The operating method of the homomorphic operation system of claim 14, wherein:

the generating of the plurality of accumulated output values comprises generating a first accumulated output value among the plurality of accumulated output values, by a first MAC unit among a plurality of MAC units, by performing a MAC operation on a plurality of elements in a first coefficient among the plurality of coefficients and a first base conversion value corresponding to the first MAC unit in the base conversion table.

16. The operating method of the homomorphic operation system of claim 15, wherein:

the generating of the plurality of accumulated output values further comprises:

receiving the first coefficient from the first MAC unit, by a second MAC unit among the plurality of MAC units; and generating a second accumulated output value among the plurality of accumulated output values by performing a MAC operation on a plurality of elements in the first coefficient and a second base conversion value corresponding to the second MAC unit in the base conversion table, by the second MAC.

17. The operating method of the homomorphic operation system of claim 16, wherein:

the generating the second accumulated output value is performed after a predetermined operation period after the generating the first accumulated output value.

18. The operating method of the homomorphic operation system of claim 17, wherein:

the generating the first accumulated output value and the receiving the first coefficient are performed simultaneously.

19. A homomorphic operation accelerator, comprising:

a first MAC unit comprising:

a plurality of first input buffers receiving and storing a first coefficient of a plurality of coefficients from a storage device in which a first ciphertext data generated based on a first base and including a plurality of coefficients is stored, a first broadcasting buffer storing a first base conversion value among a base conversion table for converting data based on the first base into a second base, and a first multiplier connected to the plurality of first input buffers and the first broadcasting buffer generating a first multiplication value by multiplying the first coefficient and the first base conversion value; and a modulo operation device coupled to the first MAC unit, wherein the modulo operation device is performing a modulo operation on the first multiplication value.

20. The homomorphic operation accelerator of claim 19, further comprising:

a second MAC unit comprising:

a plurality of second input buffers connected to the plurality of first input buffers of the first MAC unit to receive and store the first coefficient from the first MAC unit, a second broadcasting buffer storing a second base conversion value among the base conversion table, and a second multiplier connected to the plurality of second input buffers and the second broadcasting buffer, and generating a second multiplication value by multiplying the first coefficient and the second base conversion value, wherein the modulo operation device is coupled to the second MAC unit, wherein the modulo operation device is performing a modulo operation on the second multiplication value.

* * * * *